United States Patent [19]

Winner

[11] Patent Number: 5,488,844
[45] Date of Patent: Feb. 6, 1996

[54] SECURITY DEVICE

[75] Inventor: Kevin D. Winner, Hermitage, Pa.

[73] Assignee: Winner International Royalty Corporation, Sharon, Pa.

[21] Appl. No.: 233,291

[22] Filed: Apr. 26, 1994

[51] Int. Cl.⁶ .................................................. E05B 67/22
[52] U.S. Cl. .................... 70/18; 70/233; 70/39; 70/38 A; 70/DIG. 43
[58] Field of Search .................... 70/38 A, 38 B, 70/38 C, 38 R, 39, 233, 54–56, 53, 18, 20, 14, 24–26, DIG. 56, DIG. 43, 258, 260

[56] References Cited

U.S. PATENT DOCUMENTS

| 2,777,315 | 1/1957 | Burke | 292/DIG. 71 |
| 4,738,127 | 4/1988 | Johnson . | |
| 4,961,331 | 10/1990 | Winner . | |
| 5,253,497 | 10/1993 | Hsieh | 70/226 |
| 5,331,830 | 7/1994 | Su | 70/38 |
| 5,394,712 | 3/1995 | Chou | 70/38 |
| 5,398,529 | 3/1995 | Goldman et al. | 70/38 |
| 5,406,811 | 4/1995 | Nakai | 76/26 |
| 5,406,812 | 4/1995 | Jaw | 70/38 |

FOREIGN PATENT DOCUMENTS 2495555 6/1982 France ................................ 70/237

OTHER PUBLICATIONS

Six copies of photographs of CYCLOK booth at Las Vegas Interbike Show in 1993.
Letter dated 18 Oct. 1994 from Wilson Gunn M'Caw & Co.
Letter dated Jan. 5, 1995 from David Warner.
Letter dated Dec. 9, 1994 from Wilson Gunn M'Caw & Co.
Performance Bicycle Shop, Performance Bicycle, Summer—1994, p. 79.

Primary Examiner—Darnell M. Boucher
Attorney, Agent, or Firm—Vickers, Daniels & Young

[57] ABSTRACT

A device is adapted for use primarily as a theft deterrent for bicycles, mopeds and other two and three wheeled self propelled or motorized conveyances, said device comprises a pair of opposed, telescopically engaging U-shaped members and locking means associated with said members, securing them from being forcibly pulled apart. The locking means typically includes the use of a pawl and ratchet arrangement for facilitating the engagement of the two members for securing them in locking relationship. The device also includes a compressible and extendible rubber or elastomeric boot preferably in the form of bellows. This boot provides a protective cover around ratchet teeth that are longitudinally spaced along one of the arms of the two U-shaped members. The boot progressively surrounds the ratchet teeth as the rod is disengaged or withdrawn from the sleeve. The cover serves to prevent damage to the individual ratchet teeth, and in addition, provides a level of protection from scratching, chipping or marring the paint or other finish on the bicycle, etc. and injury to persons utilizing or otherwise coming into contact with the security device.

6 Claims, 7 Drawing Sheets

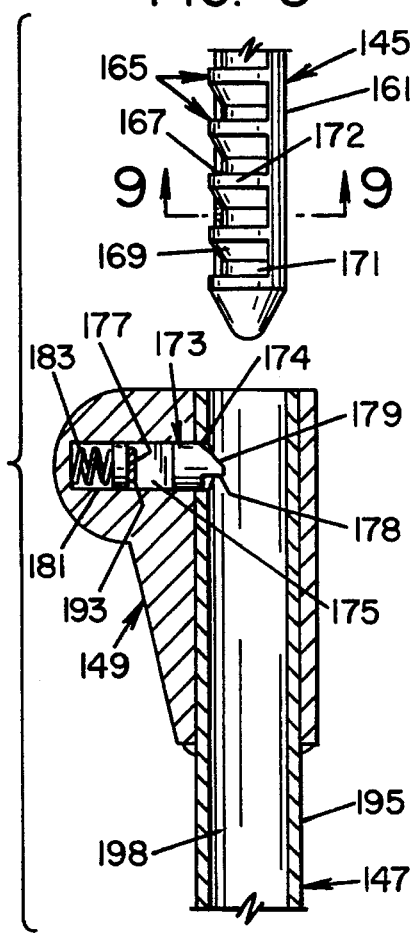
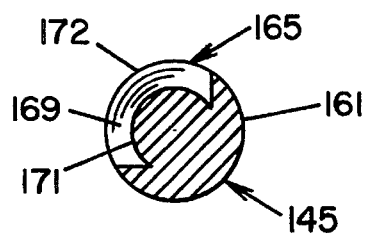
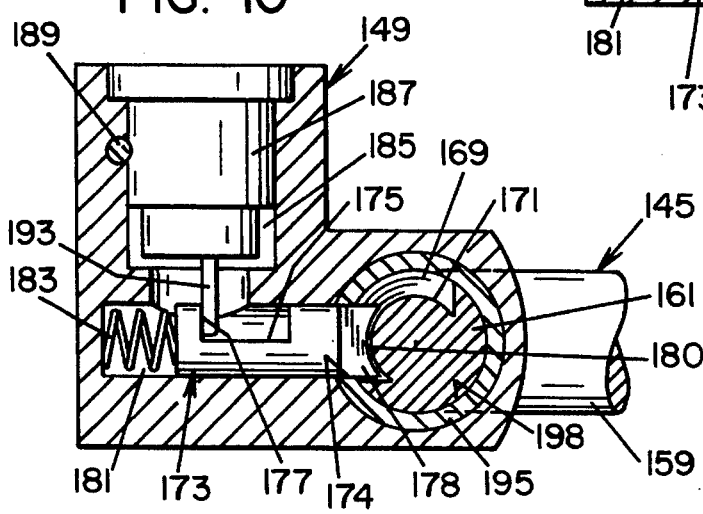

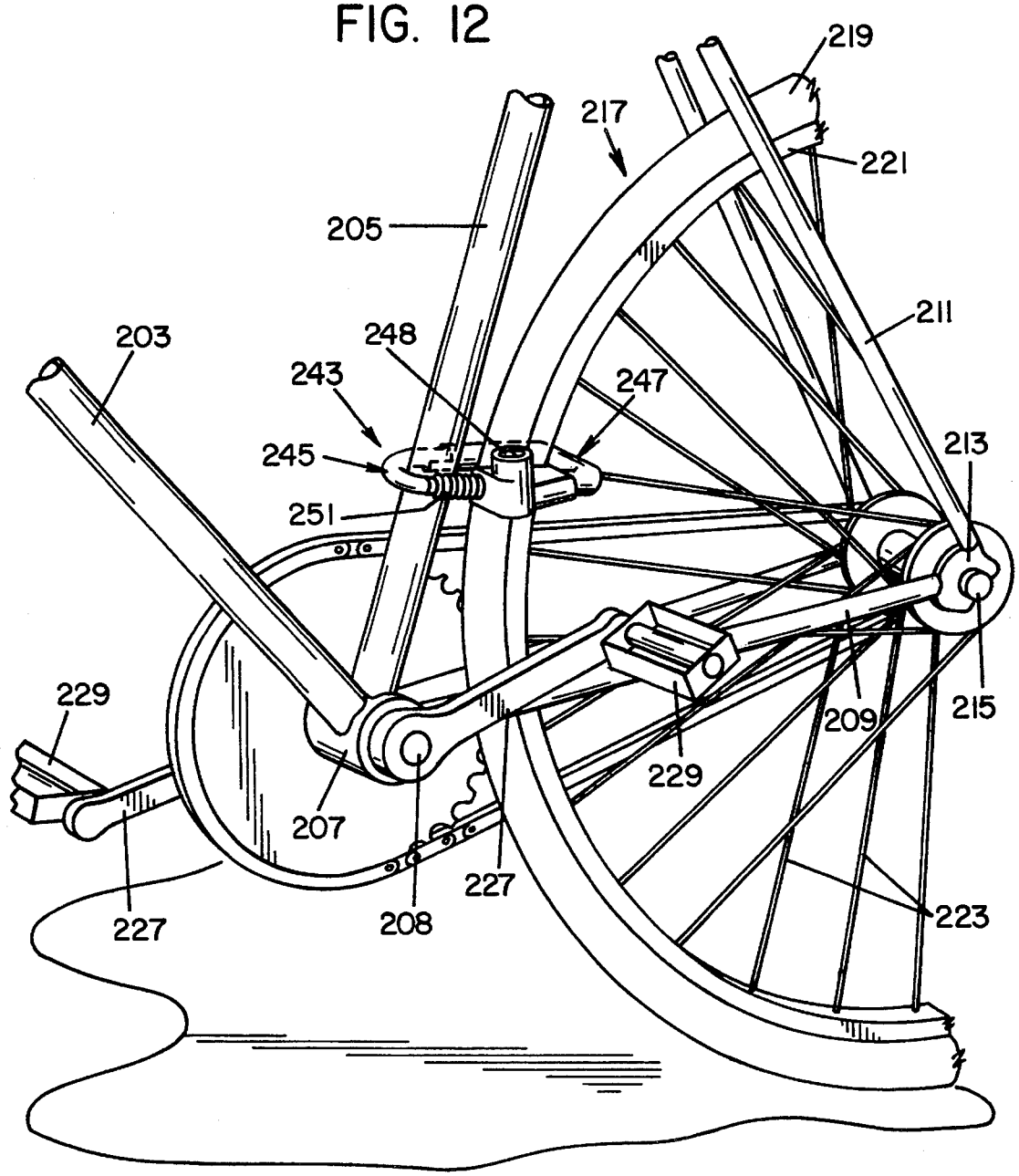

SECURITY DEVICE

FIELD OF THE INVENTION

This invention relates to a security device, more particularly a theft prevention device for use on bicycles, motorcycles, mopeds and other conveyance means. Yet more particularly, the invention relates to a lockable device useful for coupling a two or three wheeled conveyance means to a fixed object such as a pole or a bike rack to insure safety from theft, or alternatively to secure one or more wheels of e.g. a bicycle, to the frame to deter theft of the component parts thereof.

BACKGROUND OF THE INVENTION

As a means of transportation, bicycles have been around for hundreds of years. In certain cultures and countries, bicycles are a mode of transportation which rivals or exceeds cars in popularity and in practicality.

In recent years, high-tech, high-performance bicycles costing many hundreds and even thousands of dollars have been developed. These bicycles typically may use lightweight, expensive alloys, or composites for the component parts. They often include elaborate shifting, gearing and braking mechanisms. When left alone even for a few minutes, these expensive bicycles increasingly have become the target of random and organized theft. Concurrently, the growth in the theft of these expensive bicycles has compelled the development of theft deterrent devices and systems ranging in complexity from simple chain padlock combinations to sophisticated, expensive electronic warning devices.

One commonly used device comprises a hardened metal U-shaped member with a bar extending through the ends of the U, lockable into place. The device enables the owner to secure a bike or similar device to a lightpost, bike rack or other secure object. However, the device lacks the feature of adjustability to accommodate different types of bikes, bike configurations, and anchoring devices. Thus, it is necessary for bike stores to inventory several sizes of this device to permit each purchaser to buy the size needed for his or her particular style and size of bike.

Many of the other prior art devices such as padlocks and chains are deficient in one or more respects such as strength, ease with which the lock can be picked or broken, even by a relatively inexperienced thief, and stowability when not in use.

SUMMARY OF THE INVENTION

These and other drawbacks are overcome by the present invention which comprises a theft deterrent device or security system comprising a pair of opposed, generally U-shaped members, each member having a pair of parallel arms, the arms of one member being slidably engaged with the parallel arms of the other member. A lock means is associated with said U-shaped members to allow said members to be slid together, while at the same time securing the members from being pulled apart. The first U-shaped member contains a plurality of ratchet teeth spaced longitudinally along one of the parallel arms and the lock means includes a pawl adapted to engage said ratchet teeth to permit sliding of the U-shaped members together while preventing the members from being pulled apart when the lock means is locked. The second U-shaped member includes a tubular sleeve to slidably receive said arm containing the ratchet teeth. Further means are included for progressively covering the ratchet teeth with a protective boot as the arm is withdrawn from the sleeve.

In another aspect of the invention, a security device utilizes a rod slidably received within a cylindrical sleeve wherein the rod contains a plurality of longitudinally spaced ratchet teeth. A flexible protective boot is associated with the rod and is adapted to telescopically cover the ratchet teeth on the rod as the rod is withdrawn from the sleeve. This boot preferably comprises an elastomer or rubber molded in the shape of hollow compressible bellows. As the ratchet arm is inserted into the sleeve, the bellows compress together as an accordion. However, as the arm is withdrawn from the sleeve, the bellows resume their natural extended shape, covering the ratchet teeth thereby protecting the teeth from damage and weathering by the elements, and protecting the user from contacting and being pinched or cut by the edges of the ratchet teeth, and protecting the surface finish of the bike from scratches or other damage.

It is an object of the present invention to provide a theft deterrent device of the type useful on bicycles, mopeds, and other two and three wheeled conveyances means, whether self propelled or adapted to be propelled by persons, said security device having greater adaptability than those of the prior art.

Another objective is a security device containing safety features which discourage attempts at theft.

Yet another feature is a bicycle security device that is collapsible to reduce its overall size when not in use, while providing more adaptability in use.

Still another feature is a locking device employing a pawl and ratchet design, that is safe to use for security purposes, and resists disengagement when locked.

BRIEF DESCRIPTION OF THE DRAWINGS

These and other objects which will become apparent upon reading the following description are achieved in the manner to be hereinafter described, with particular reference to the drawings in which;

FIG. 8 is a view of a variation of the present invention showing ratchet teeth partially circumscribing a rod aligned with a sleeve;

FIG. 9 is a view taken along line 9—9 of FIG. 8;

FIG. 10 is a detailed cross sectional view of the lock employing the ratchet teeth shown in FIGS. 8 and 9 with the lock in the closed position;

FIG. 11 is a cross sectional view similar to FIG. 10 with the ratchet arm swung into the open position;

FIG. 12 is a perspective view similar to FIG. 1 showing a smaller version of the lock of the present invention adapted to secure a wheel of a bicycle to the bicycle frame.

DETAILED DESCRIPTION OF THE INVENTION

Figure 1:
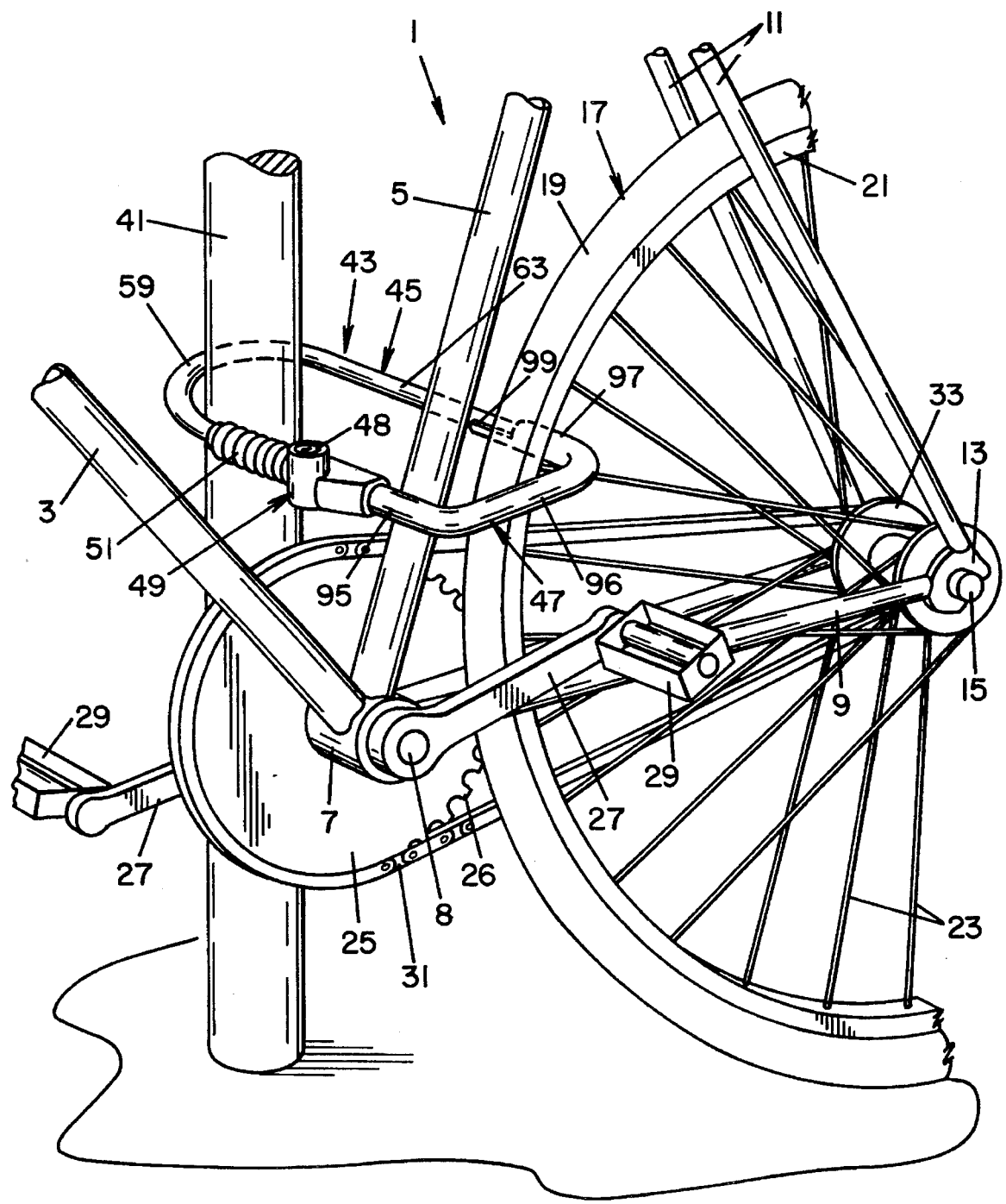
FIG. 1 is a perspective view of a portion of a chain driven bicycle secured to a post.

Referring now to the drawings, FIG. 1 shows in perspective a portion of a two wheeled bicycle 1. The frame of the bicycle includes a down tube 3, a seat tube 5 and a chain stay 9 all joined to a bracket shell 7. Shaft 8 extends through bracket shell 7 and is connected to cranks 27. Chainwheel 25 containing a plurality of teeth 26 on the circumference thereof engages chain 31. Two pedals 29 are connected to the cranks 27. The chain stay 9 and seat stay 11 converge to form two dropouts 13 into which the rear wheel axle 15 is secured. The rear wheel 17 comprises a tire 19 mounted on rim 21 held in place around the axle 15 by spokes 23. Teeth (not shown) on free wheel 33 are engaged by chain 31 whereby the bicycle is propelled by a rotational movement of the pedals said movement being transmitted through the chain wheel 25 and chain 31 to free wheel 33.

A security device 43 is shown coupling the bicycle 1 to an immovable post 41. The device comprises a U-shaped rod 45 engaging a U-shaped tubular sleeve 47 and held in position by lock 48. The rod 45 contains a plurality of longitudinally extending ratchet teeth (not shown) covered by flexible boot 51 which is in the shape of a diaphragm or bellows. The sleeve 47 is shown extending around seat tube 5 and wheel 17 to insure not only that the bicycle frame cannot be taken, but that the wheel 17 cannot be readily removed from the dropout 13 and taken while leaving the bike frame secured to the post. Added security can be achieved by disengaging the front wheel from the frame and securing it to the post 41 with the security device 43.

Figure 2:
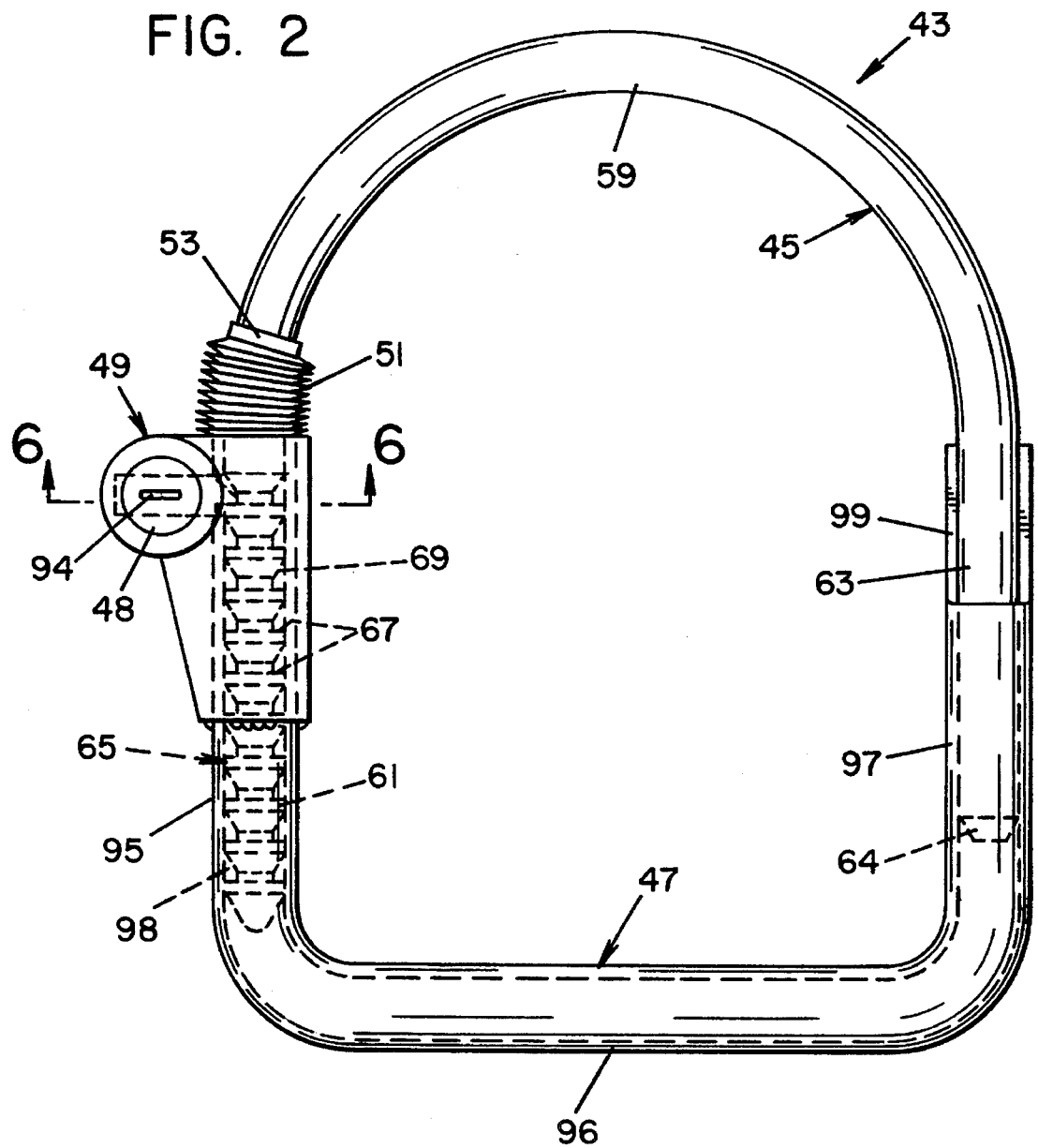
FIG. 2 is an elevational view of an assembled security device of the present invention.
Figure 3:
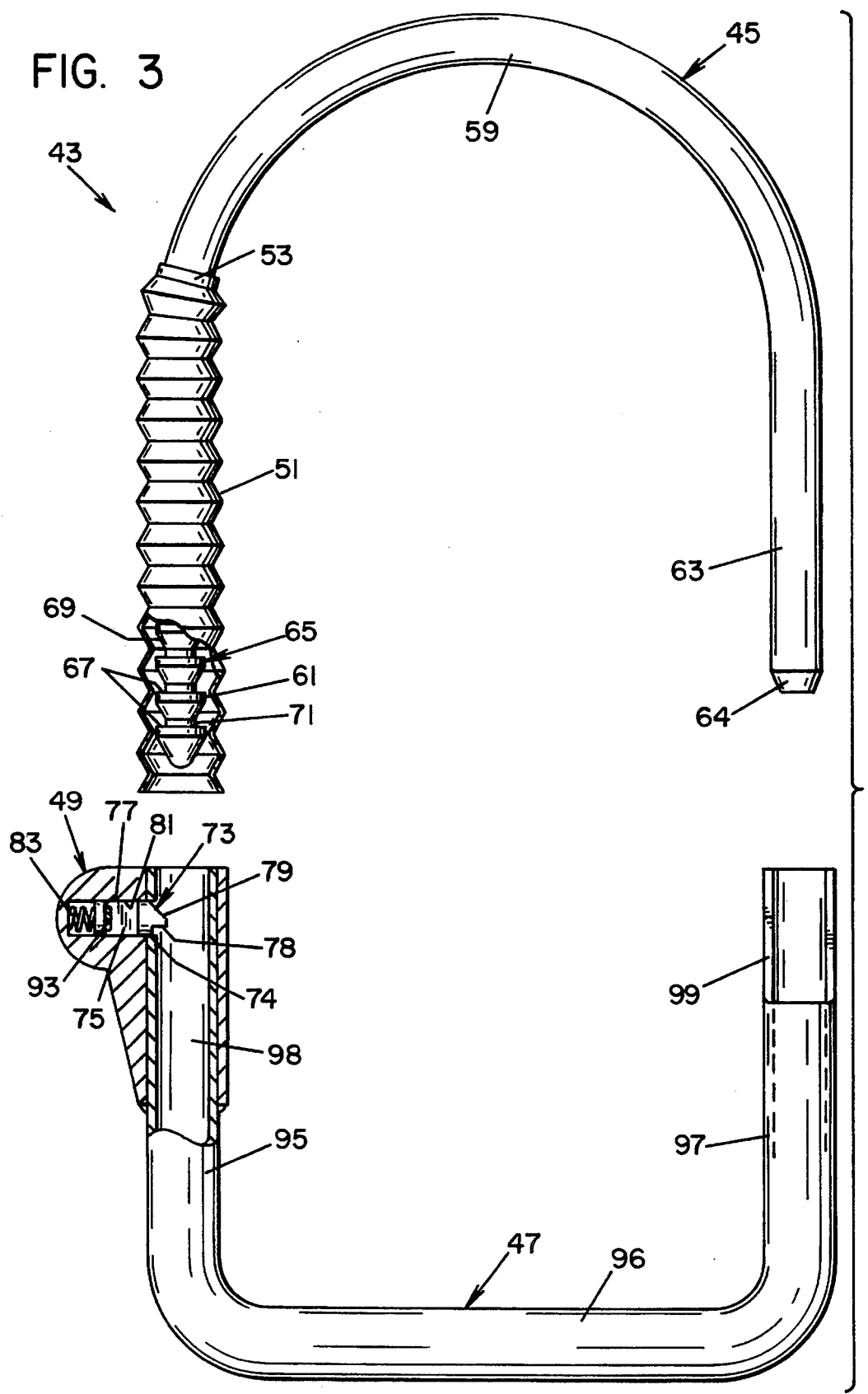
FIG. 3 is an elevation of the same device disassembled, shown partially in cross section.

FIG. 2 shows the security device 43 of the present invention in a fully closed position and FIG. 3 shows it in the open or extended position. The device 43 comprises a rod 45 preferably fabricated from case-hardened steel, said rod consisting of a pair of parallel rod arms comprising first arm 61 and second arm 63 joined together by the curved base or bight 59 of the rod. Sleeve 47 preferably fabricated from a piece of steel tubing, is shown in the shape of a U having a base 96 joining a first tubular sleeve 95 and a second tubular sleeve 97 parallel to the first. Lock housing 49 telescopically engages said first sleeve 95 and is secured thereto by suitable means such as brazing or welding. The lock housing includes lock means 48, to be hereinafter described in greater detail. Flexible boot 51, secured to rod arm 61 contacts lock housing 49 and the individual bellows or accordion pleats are compressed or folded together when the ratchet teeth telescopically engage said first tubular sleeve 95.

The flexible boot 51 in a normally extended position as shown in FIG. 3 surrounds the portion of the first rod arm 61 having the ratchet teeth 65 thereon. Preferably the boot 51 includes a flange 53 which surrounds rod arm 61 and is secured thereto. The flange 53 may be of the same material as the boot, being an integral part thereof. Alternatively, it may be a metal sleeve molded to the end of the boot and secured to the rod by means such as an adhesive, spot welding, or a set screw.

The lock 48 contains a pawl 73 in blind hole 81, said pawl having an angular end surface 79 urged into the passageway 74 in sleeve arm 95 by spring 83. Second sleeve arm 97 contains a notch 99 to facilitate assembly of the security device. The first arm 61 of rod 45, containing the ratchet teeth, is slightly longer by about ½" to 1½" than the second arm 63. During assembly, the first arm 61 is inserted into the first parallel sleeve arm 95 a short distance after which the rod may be pivoted around until the second arm 63 contacts and engages the notch 99 of the second sleeve arm 97 whereupon the tapered end 64 facilitates the telescopic engagement of the two arms of the rod into the two parallel sleeve arms of sleeve 47.

The security device of the present invention preferably employs a locking mechanism similar to that used in an automobile security device of the type commonly referred to as "The Club". The details and modifications of this locking mechanism are shown in the following United States Patents, the teachings of which are incorporated herein by reference; U.S. Pat. No. 4,738,127 issued Apr. 19, 1988; U.S. Pat. No. 4,856,308 issued Aug. 15, 1989; U.S. Pat. No. 4,935,047 issued Jun. 19, 1990 and U.S. Pat. No. 5,277,042 issued Jan. 11, 1994. Briefly, these patents describe a plurality of longitudinally extending frusto-conical projections or spaced grooves on a case-hardened steel rod which telescopically engages a sleeve and is capable of being locked to prevent collapsing movement. A suitable key operated device actuates a spring loaded pawl which engages the grooves between adjacent frusto-conical projections to prevent collapsing movement. Alternatively, the lock may involve the use of ball bearings, rather than a pawl, to engage curved grooves that extend longitudinally of the rod. The device is adapted to be locked onto the inside rim of a steering wheel of an automobile. The lock serves to prevent the rod from telescopically collapsing into the sleeve.

Any one of the locking features shown in these references may be used, with appropriate modifications, in the lock of the present invention. One specific modification involves the reversal of the directions of the frusto-conical teeth on the rod. The device described in the previously mentioned patents contains ratchet teeth which are adapted to prevent the rod, when in a locked position, from telescopically collapsing into the sleeve. However, in the embodiments described in connection with the present invention, one objective is to prevent, when the device is locked, the rod from being telescopically removed from the sleeve. Therefore, it is necessary to reverse the direction of the ratchet teeth on the rod from the direction shown in said patents. This feature is clearly shown in FIGS. 4 and 5.

Figure 4:
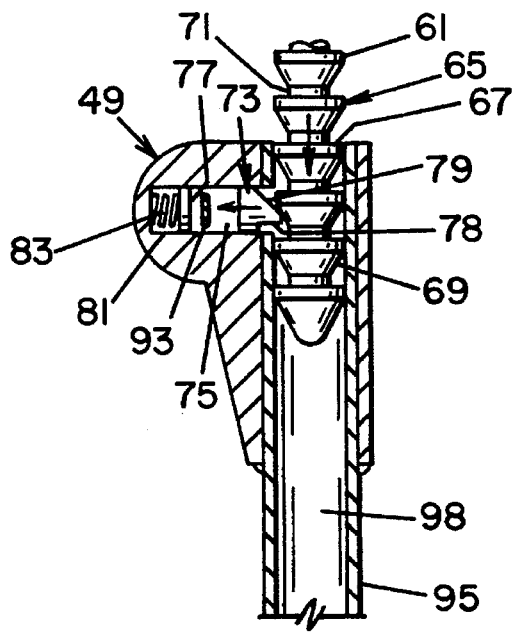
FIG. 4 is an enlarged partial cross sectional view of a portion of the lock showing movement of the ratchet teeth during assembly of the lock.
Figure 5:
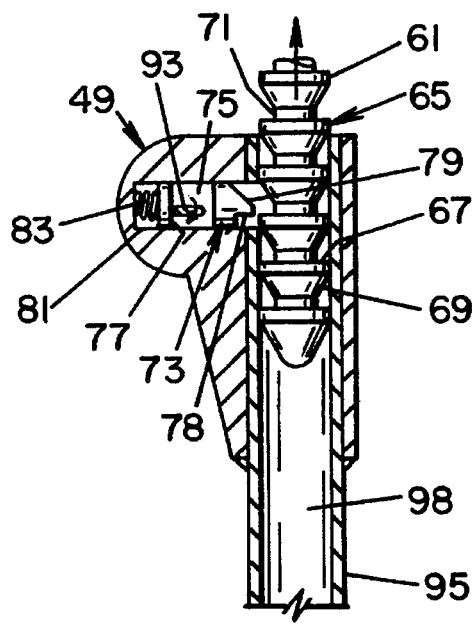
FIG. 5 is a partial cross sectional view of the same portion of the lock showing the ratchet teeth being withdrawn from the lock.

FIG. 4 shows the action of the locking mechanism with the rod arm being inserted into the cylindrical sleeve, while FIG. 5 shows the locking mechanism in the unlocked position, with the pawl in the retracted position thereby facilitating removal of the rod arm from the sleeve. The lock housing 49 includes a lock passageway of circular cross section having a diameter corresponding to the outside diameter of the first sleeve so that the lock housing is telescopically receivable over the sleeve. The sleeve contains a sleeve hole 74 extending through the wall thereof. The lock housing includes a blind hole 81 aligned with, and having an inner diameter approximating the diameter of the sleeve hole 74. Lock housing 49 further comprises a lock cylinder hole 85 at right angles to the blind hole 81. The locking mechanism disposed within the lock housing 49 includes a coil spring 83 and a ratchet pawl 73 extending from the coil spring through the sleeve hole and projecting into the annular passageway 98 in the first sleeve arm 95. The ratchet pawl 73 includes an angular end surface 79, a groove 75 and a torque blade surface 77 within the groove 75. The locking means further comprises a key lock cylinder 87 having a key slot 94, (shown in FIG. 7) and a torque blade 93. The torque blade extends into the slot 75 in the ratchet pawl 73 to register and cooperate with the torque blade surface 77.

Figure 6:
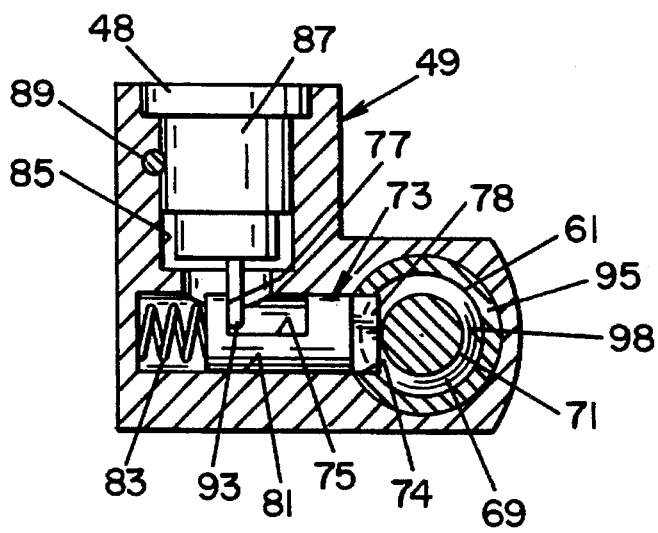
FIG. 6 is a detailed cross sectional view taken along line 6—6 of FIG. 2 of a lock mechanism useful in connection with the present invention.

As shown in FIG. 1, the lock housing is arranged with respect to the U-shaped arms of the security device in such a manner to facilitate locking and unlocking the same, so as not to interfere with securing a bicycle to a post or securing a tire to the frame of the bicycle. Operation of the locking means, when the rod contains ratchet teeth totally circumscribing the rod is shown in FIGS. 4, 5 and 6. A corresponding operation of the lock when the ratchet teeth only partially circumscribe the rod is shown in FIGS. 8–11.

As shown in FIG. 6, the coil spring 83 normally biases the ratchet pawl 73 outwardly of the blind hole 81 into engagement with the inner cylindrical surface 71 of the ratchet teeth 65. Movement of the rod member through the annular passageway 98 of the first sleeve 95 indicated by the arrow in FIG. 4 causes the conical bearing surface 69 of the ratchet teeth to act against the angular end surface 79 of the pawl, whereby the pawl 73 is biased into the blind hole 81 thereby compressing spring 83. As each ratchet tooth passes the pawl, the spring 81 urges the pawl back into the annular space between the conical surfaces, causing the clicking ratchet sound common to this type of device. Use of the key lock cylinder 87 to rotate torque blade 93 to act against the torque blade surface 77 of the pawl, as shown in FIG. 5, holds the pawl in a position retracted from the annular passageway, thereby permitting withdrawal of the rod 61 from sleeve 95. However, with the pawl in the position shown in FIG. 4, the stop surface contact 78 of the pawl abuts the stop surface 67 of the ratchet tooth thereby preventing the rod arm 61 from being withdrawn from the first sleeve. This represents the device in the locked position. The key lock cylinder is retained within the key hole by locking pin 89.

Figure 7:
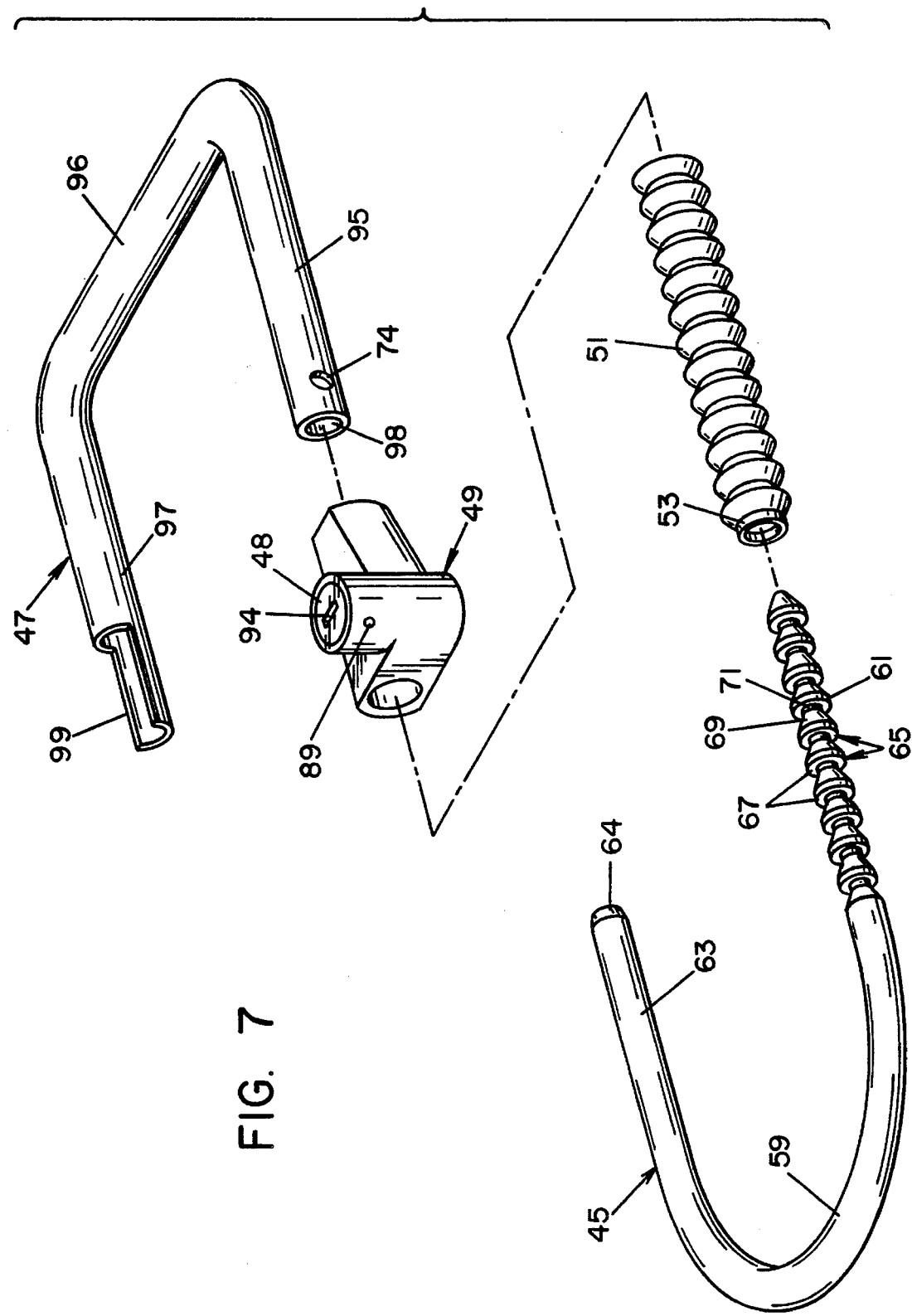
FIG. 7 is an exploded perspective view of the component parts of the present invention.

FIG. 7 shows an exploded view of the device of the present invention comprised of four component parts including steel rod 45, boot 51, lock housing 49 and sleeve 47. Clearly shown in this view is the hole 74 in the first parallel sleeve arm 95. This hole is adapted to coincide with the pawl (not shown), engaged in the blind hole within the lock housing 49. Clearly shown in the second sleeve arm 97 is the notch 99 which is adapted to facilitate assembly of the parts.

It will be noted in FIG. 7 that the boot 51 is comprised of a plurality of longitudinally juxtaposed, integrally joined compressible bellows in the normally extended state. The relaxed length of the bellows is sufficient to cover all of the longitudinally spaced ratchet teeth 65 on the first arm 61 of rod 45. Means such as flange 53 bonded to the bellows adapted to secure the bellows to the arm 61 immediately beyond the ratchet teeth in the manner previously described.

The boot useful in this invention is typically prepared by molding a rubber or elastomeric composition into shape and curing or vulcanizing the shape under elevated temperatures and pressures. The composition is compounded with suitable cross linking agents and fillers. It preferably includes antioxidizing agents and other additives to prevent the boot from cracking and crazing upon flexing, stretching and exposure to sunlight and other atmospheric and weather related conditions. When cured, the rubber or elastomer is transformed from a thermoplastic to a thermosetting material.

Most cured rubbers and elastomers having acceptable deformation and elastic recovery properties coupled with good weathering characteristics are suitable for use in the present invention. The selection, compounding and molding of these materials are carried out according to established techniques well known in the trade. Examples of suitable elastomers and rubbers are butyl rubber, neoprene and natural rubber (polyisoprene). Other elastomers including certain polyurethane compounds and polychloroprene may be used.

Instead of using compressible bellows, other means may be employed for providing an elastic protective covering for the ratchet teeth. Thus, an elastomer having very good elongation properties may be formed into a cylindrical sheath with one end detachably or permanently joined to the rod immediately beyond the teeth and the other end joined to the sleeve or the lock housing. Thus, as the rod is retracted from the sleeve, the sheath elongates to surround the teeth as they are exposed. This variation can be used with the ratchet teeth continuously engaged with the sleeve while still permitting the second rod arm to become disengaged from the notch in the second sleeve arm and to be rotated with respect thereto as previously described to permit coupling and uncoupling of the security device from the cycle.

Although the embodiments hereinabove described involve the use of ratchet teeth that totally circumscribe rod 61, it can be readily determined that there may be no need to be able to rotate the rod 45 in a full 360 degree arc in order to secure the bicycle to a tree, post or other anchor. In fact, FIGS. 8–11 shown an embodiment where the ratchet teeth extend less than halfway around the rod.

FIG. 8 shows rod 145 axially aligned with arm 195 of sleeve 147 adapted to be inserted in annular passageway 198. A plurality of ratchet teeth 165 are disposed longitudinally along the said rod 145, each of said teeth comprising a stop surface 167 and a partially conical surface 169 connecting inner partially cylindrical surface 171 with outer partially cylindrical surface 172. The ratchet teeth are preferably machined into the rod according to standard techniques well known in the trade.

As in the previous embodiment, a lock housing 149 is adapted to fit over sleeve arm 195 and to be securely coupled thereto. The lock housing contains a blind hole 181 in which a spring 183 bears against the ratchet pawl 173 urging the pawl through sleeve hole 174 into annular passageway 198. The operation of the locking mechanism is identical to that described in connection with the previous embodiment. The rachet pawl 173 contains a groove 175 into which extends torque blade 193. This blade comprises part of the lock cylinder 187 positioned in key hole 185 and held in place by locking pin 189. Rotation of the torque blade 193 by the use of a key in the lock cylinder 187 will cause said torque blade to bear against the torque blade surface 177 to urge the pawl out of the annular passageway 198 thereby permitting free movement of rod 145 into and out of sleeve arm 195.

FIG. 10 shows the positional relationship of the bottom surface or bight 159 of the rod 145, when the two parallel arms of rod 145 are engaged with the corresponding arms of sleeve 147. It will be noted that the end 180 of the pawl 173 is curved rather than straight as shown in the FIG. 6 embodiment. The curved surface contacts the inner semicylindrical surface of 171 of the tooth 165. When in this position, stop surface contact 178 of pawl 173 abuts stop surface 167 thereby preventing removal of rod 145 from sleeve 147. However, as previously described, further movement of the rod into the sleeve when the device is unlocked, is achieved as each of the conical surfaces 169 pushes pawl 173 into blind hole 181 compressing spring 183 until the outer surface 172 of tooth 165 passes the curved edge of the pawl whereupon the spring 183 biases the pawl against the next adjacent inner surface 171.

The first parallel arm 161 of rod 145, as previously mentioned, is preferably ½" to 1½" longer than said second parallel arm, thereby permitting the first arm to be inserted into the first sleeve arm 195 of sleeve 147 prior to the second arm engaging the second sleeve arm. At the same time, if the first rod arm 161 is inserted far enough so that the teeth become ratcheted against the ratchet pawl, mounting the security device on the cycle, and securing it to a post or other security means is facilitated by permitting the first arm to be rotated at least 90 degrees with respect to the second arm, as shown in FIG. 11, and thereafter moving the rod 145 to the position shown in FIG. 10 whereupon the second rod arm engages the notched portion of the second sleeve in the same manner previously described.

FIG. 12 shows another adaptation of the present invention wherein a security device is used to securely attach the wheel of a bicycle to the frame thereof, thereby preventing the removal and theft of the wheel. As previously noted, the portion of the bike shown in FIG. 12, includes a down tube 203, seat tube 205 and chain stay 209 joined to a bracket shell 207. Cranks 227 are attached to shaft 208 extending through the bracket shell, and are rotatably engaged therewith through the use of suitable ball bearings or the like. Pedals 229 are attached to the free ends of the cranks 227.

Seat stay 211 and chain stay 209 converge to form a dropout 213 adapted to hold the rear wheel 217. This wheel includes a tire 219, rim 221 and spokes 223 connected to axle 215. Because of the removing and taking wheels from a bicycle, particularly with quick release connections, the rear wheel is secured to the seat tube by security device 243. The device is smaller than but is otherwise identical to the devices already described in detail. The device consists of a generally U-shaped rod 245 adapted to engage corresponding arms of sleeve 247. The rod contains the ratchet teeth covered by boot 251, the entire device being secured against separation of the rod from the sleeve by lock means 248.

As previously mentioned, the bellows are molded or otherwise formed from a suitable elastomer or rubber. The other components of the present device—the two U-shaped members and the parts of the locking mechanism are made from materials that are reasonably capable of withstanding efforts to pick or break the lock, to cut through the rod or the sleeve or to force the two U-shaped members apart. As previously mentioned steel tubing and a case hardened steel rod have been found to be satisfactory materials of construction for "The Club" and also work well in the production of the device of the present invention. However, there is a tendency to use light weight materials in the production of bicycles and their components as well as accessories carried on the bike or on the person of the bike rider. For this reason, the use of light weight materials such as steel alloys, titanium, and its alloys, aluminum alloys, and non metallic composites should be considered for the construction of all or some of the components of this device. The practicality of their use is governed by the ability to form them into the desired shape and by the ability of the device to prevent the thefts intended to be discouraged by its use.

Preferably, a suitable coating of a plastisol is applied to all of the exposed metal surfaces of the device that are not covered by the boot and that may contact the bike. This coating, cooperative with the boot will prevent the device from scratching or otherwise marring the finish on the bike. If the device is carried on the bike when the device is not in use, the polymer coating also prevents annoying metal to metal noise as the bike is moving.

It can readily be determined that the invention includes other variations and modifications without departing from the scope thereof. For example instead of making the arm containing the ratchet teeth longer than the other arm of the rod, the same effect can be achieved by making the first sleeve arm of the sleeve longer than the second sleeve arm. Furthermore, the bellows shaped boot can be temporarily or detachably connected to the ratchet arm rather than being permanently affixed thereto.

It will be appreciated that other modifications or alterations can be made in the present invention without departing from the scope thereof as covered by the appended claims and their equivalents.

What is claimed is:

1. A theft deterrent device comprising:
   (a) first and second opposed generally U-shaped members, each member having first and second parallel arms, the parallel arms of one member being telescopically engaged with the parallel arms of the other member;
      (1) the first member comprising a rod, the first parallel arm of said first member containing a plurality of ratchet teeth spaced longitudinally therealong, said first arm extending beyond the end of the second arm a distance between about ½-inch and about 1½ inches;
      (2) the second member including a first arm comprising a first tubular sleeve to telescopically receive said arm containing the ratchet teeth and a second arm comprising a second tubular sleeve, the open end of said second sleeve being notched to facilitate engagement of said second arm of said first member with said second tubular sleeve when telescoping the members together;
   (b) lock means associated with said first and second U-shaped members, said lock means including a pawl engaging the ratchet teeth to permit said members, when engaged, to be telescoped together while preventing them from being pulled apart when said lock means is locked and to permit movement in either direction when said lock means is unlocked; and
   (c) protective means for progressively covering and surrounding the ratchet teeth as the arm containing said teeth is withdrawn from the first tubular sleeve, said means comprising a flexible bellows, one end of said bellows being joined to said rod and the other end contracting or elongating as the arm is moved into or out of said sleeve.

2. The device according to claim 1 wherein the ratchet teeth fully circumscribe the rod.

3. The device according to claim 1 wherein said lock means includes a lock housing joined to the first tubular sleeve of said second member.

4. The device according to claim 3 wherein said lock housing includes a key lock which actuates the pawl to engage and disengage the ratchet teeth.

5. The device according to claim 3 wherein said pawl is spring-biased into contact with the ratchet teeth when engaged by the key lock.

6. The device according to claim 1, wherein the ratchet teeth are evenly spaced along the length of said first arm.

* * * * *